United States Patent [19]
Li et al.

[11] Patent Number: 5,930,783
[45] Date of Patent: Jul. 27, 1999

[54] SEMANTIC AND COGNITION BASED IMAGE RETRIEVAL

[75] Inventors: Wen-Syan Li, Fremont, Calif.; Kasim S. Candan, Scottsdale, Ariz.

[73] Assignee: NEC USA, Inc., Princeton, N.J.

[21] Appl. No.: 08/920,780

[22] Filed: Aug. 29, 1997

Related U.S. Application Data

[60] Provisional application No. 60/038,300, Feb. 21, 1997.

[51] Int. Cl.⁶ .................................................. G06F 17/30
[52] U.S. Cl. ............................ 707/1; 707/104; 707/3; 382/230
[58] Field of Search ............................ 707/1, 104, 3; 382/230, 124, 181, 220

[56] References Cited

U.S. PATENT DOCUMENTS

| | | | |
|---|---|---|---|
| 5,493,677 | 2/1996 | Balogh et al. | 707/104 |
| 5,729,704 | 3/1998 | Stone et al. | 345/346 |
| 5,751,286 | 5/1998 | Barber et al. | 345/348 |
| 5,781,773 | 7/1998 | Vanderpool et al. | 707/100 |

*Primary Examiner*—Paul R. Lintz
*Assistant Examiner*—Ella Colbert
*Attorney, Agent, or Firm*—Sughrue, Mion, Zinn, Macpeak & Seas, PLLC

[57] ABSTRACT

A computer implemented method for searching and retrieving images contained within a database of images in which both semantic and cognitive methodologies are utilized. The method accepts a semantic and cognitive description of an image to be searched from a user, and successively refines the search utilizing semantic and cognitive methodologies and then ranking the results for presentation to the user.

37 Claims, 11 Drawing Sheets

Select image P
Where X is human
and X to_the_right_of Y
and Y i_like (1) X is person (Semantics-based Query)
(2) Y i_like 🖥 (Cognition-based Query)
(3) X to_the_right_of Y (Scene-based Query)

Select P
where P contains green tree
and P contains Y
and Y i_like

SEMANTIC AND COGNITION BASED IMAGE RETRIEVAL

This application claims the benefit of U.S. Provisional Application 60/038,300 filed Feb. 21, 1997.

FIELD OF THE INVENTION

The present invention relates generally to the field of databases and in particular to a method and system for retrieving images contained within a database using both semantic expressions and image examples.

BACKGROUND OF THE INVENTION

Image databases are databases that contain digital data of images and are finding ever-increasing uses in business and entertainment. The widespread use of image databases, however, is intensifying the need to develop more effective ways of searching such databases.

By way of background, a database is a collection of related data. Oftentimes, the data in a database is structurally organized as tables, fields and records. Generally, each record in the database possesses a set of attributes and a user may wish to conduct a search of the database based upon a value of one or more of the attributes. For example, in a database of football statistics, one may desire to search for all quarterbacks who completed 100 or more passes in a single season, etc.

In conducting such a search, it is assumed that each record possesses several attributes and the user wants to search for all records that possess certain values of certain attributes. The specification of which records are desired is called a query and is usually restricted to one of three types: a) A simple query which specifies a specific value for a specific attribute; e.g., THROWINGARM=LEFT; or THROWINGARM=RIGHT; b) a range which specifies a specific range of values for a specific attribute; e.g., WEIGHT<220 or, 180<WEIGHT<220; and c) a BOOLEAN such as (THROWINGARM=LEFT) AND (HEIGHT>6') and (COMPLETIONS>99)).

Unfortunately, such query-based methods do not permit one to effectively search an image database because: (1) image data is generally not well annotated with textual attribute descriptions, and (2) the vocabulary needed to describe a user's query may not exist or at least not be know to the user. Consequently, the prior art has shown an increasing interest in developing image search and retrieval methods.

At present, there exist several principal approaches to image retrieval from databases.

1. Browsing and navigational searching: In this approach, users are presented with directories wherein each directory contains a single category of images (e.g. business, people, and plants). The users navigate through the directories and select a particular one in which to browse, generally containing images of a similar category.
2. Syntactic keyword searching: Using this approach, users input keywords and are subsequently presented with the images whose captions or keyword lists contain the specified keyword(s).
3. Descriptive semantics searching: With descriptive semantics searching, users specify semantics of the image they want to retrieve. This approach requires the semantics of the query and images to be explicit so that the query processor can determine the similarity. A scene-based image retrieval can be viewed as a type of semantics-based search. An example query of this type of search would be "Retrieve images in which there is a man next to a tree."
4. Cognition-based search: The cognition-based search supports queries by content semantics. Users pose queries by providing drawings or image examples. The system retrieves images which are similar to the example provided by the user. For example, a user may pose a query by drawing a picture where there is a man next to a building, and the system would retrieve images similar to his drawing.

Numerous prior-art methods and systems attempting to overcome the drawbacks associated with image searching and utilizing one or more components of the above methods have been described. One such system is the COIR (Content-Oriented Image Retrieval) system which was described in an article entitled "Content-Oriented Integration in Hypermedia Systems", authored by K. Hirata, Y. Hara, H. Takano, and S. Kawasaki and which appeared in the *Proceedings of* 1996 *ACM Conference on Hypertext* in March, 1996. COIR utilizes an image retrieval technique based upon a set of features extracted from images, such as colors and shapes. Unlike most other existing approaches, where feature extraction and image matching techniques are based on the whole image, COIR's feature extraction and image matching techniques are object-based.

Another prior-art system, Virage, which was described by J. R. Bach, C. Fuller, A. Gupta, A. Hampapur, B. Horowitz, R. Jain and C. F. Shu in an article entitled "The Virage Image Search Engine: An Open Framework for Image Management" which appeared in *Proceedings of the SPIE—The International Society for Optical Engineering: Storage and Retrieval for Still Images and Video Databases,* 1993, is a system for image retrieval based on visual features, or image "primitives". These primitives can be general, such as color, shape, or texture, or domain specific. Virage transforms images from a data-rich representation of explicit image pixels to a more compact, semantic-rich representation of visually salient characteristics. These primitives are then used to solve specific image management problems.

The QBIC (Query By Image Content) system which was described by W. Niblack, R. Barber, W. Equitz, M. Flickner, E. Glasman, D. Petkovic, P. Yanker, C. Faloutsos, and G. Taubin in an article entitled "The QBIC Project: Quering Images by Content Using Color, Texture, and Shape", which appeared in *Proceedings of the SPIE: Storage and Retrieval for Images and Video Databases,* 1993, is a system for image retrieval. It allows users to query an image collection using features of image contents, such as color, texture, shape, location, and layout of images. With the QBIC system, queries are formed graphically.

Finally, the SCORE system which was described by Y. Aslandogan, C. Yu, C. Liu and K. Nair in an article entitled "Similarity based Retrieval of Pactures Using Indices on Spatial Relationships" which appeared in *Proceedings of the* 1995 *VLDB Conference,* held in Zurich, Switzerland in 1995, is a system for similarity-based image retrieval. This system using a refined ER model to represent the contents of pictures and the calculation of similarity values based on such representations. Users can use icons to specify objects, say man and phone, and then specify their relationship to one another.

Despite the relative advantages associated with each of the above approaches however, each presents a set drawbacks and limitations as well. Specifically, the semantics-based approach is good at image retrieval based on image semantics. However, since images are visual and hard to describe in detail using only text, this approach suffers from a low visual expressive capability. Another weakness of the semantics-based approach is that the semantics of images must be specified explicitly before the search is performed.

The cognition-based approach, on the other hand, advantageously uses visual examples. Unfortunately, user generated drawings tend to be rather imprecise thereby leading to search ambiguity. Consequently, if a user of a cognition based system wanted to retrieve all of the images in a database containing a taxi, this approach would likely retrieve a very large number of images with cars, but not necessarily taxis. A further weakness of this cognition approach is that it can not support queries on generalized concepts. For example, if a user wants to retrieve all images in which there is some kind of an appliance, the user must provide drawings for all possible appliances, such as TVs, radios, computers, and CD players. As such, it is simply not practical for most applications.

Consequently, a continuing need exists in the art for techniques which provide for the efficient searching of images contained within a database of images.

SUMMARY OF THE INVENTION

The present invention is directed to a computer technique and apparatus for image search and retrieval that advantageously utilizes both semantic and cognition-based methodologies. The computer includes a data processing system, a visual display unit and a data entry device. An operating system, a text/graphic interactive user interface and a number of programs reside in the data processing system.

The technique advantageously allows users to present search and retrieval queries to the system using both semantic expressions and image/drawing examples. An example of such a query is: "Retrieve all images in which there is a person who is to the right of an object that looks like this drawing". In such a case, three types of queries are involved: semantics-based (using textual specifications), cognition-based (i.e. using cognition specification), and scene-based (i.e. using object spatial relationship specification).

While prior art methods and techniques generally use only one of these methods. our inventive technique advantageously utilizes these multiple methodologies simultaneously, as appropriate.

DETAILED DESCRIPTION

A detailed description of the invention will now be presented while referring to the figures, several of which may be simultaneously referred to during the course of the following description.

Figure 1A:
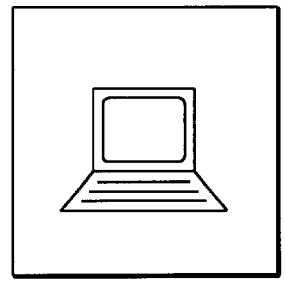
FIG. 1(a) is a schematic diagram showing an example query according to the present invention.
Figure 1B:
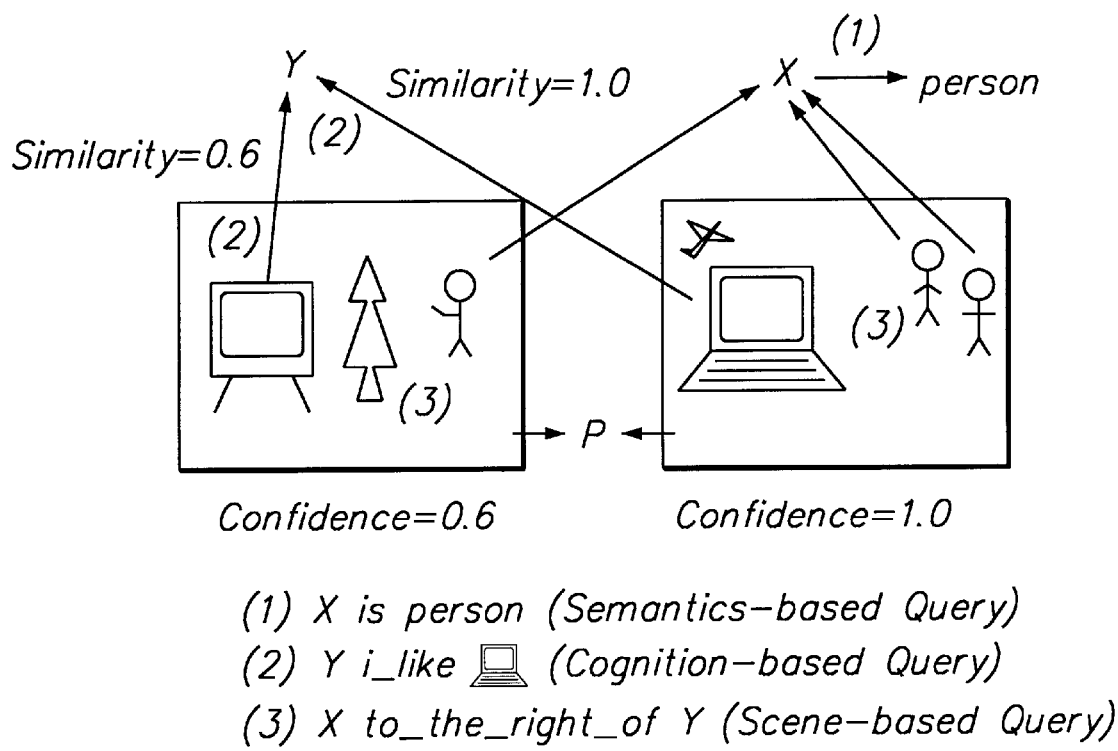
FIG. 1(b) shows the results for the example query of FIG. 1(a)

Before we discuss the details of our inventive technique, however, an example showing our technique is appropriate. As noted earlier, our technique allows users to pose queries using both semantics expressions and image/drawing examples. With reference now to FIGS. 1(a) and 1(b), there it shows an example query "Retrieve all images in which there is a person who is to the right of an object that looks like this drawing", which may be formulated as shown in FIG. 1(a). The results for this query are shown in FIG. 1(b). The arrows in FIG. 1(b) indicate how the variables X, Y, and P are bound with images, objects in images, and/or semantic meanings. Please note that the query shown in FIG. 1(a) is simplified. The complete version of the query is "Select all images P and X is human and X to_the_right_of Y in P and Y i_like <<a sketch>> and P contains X and P contains Y", X and Y are assumed contained in P by default in SEMCOG, so these two queries are equivalent.

In this example, tree types of queries are involved: semantics-based (using textual specifications), cognition-based (i.e. using cognition specification), and scene-based (i.e. using object spatial relationship specification). The processing of this query including the following steps:

Step 1: Select all images in which there is a person. This is a semantics-based query.

Step 2: Select all images from the results of Step 1 in which there is an object which looks like the user's drawings (a workstation). Since this is a cognition-based query, uncertainty is involved in its processing. In FIG. 1(b), two objects are similar to the user drawing with the degree of similarity 0.6 (TV) and 1.0 (workstation) respectively.

Step 3: Select all images from the results of Step 2 in which there is a person or persons to the right of a workstation or a TV. This is a scene-based query.

Step 4: Present the user with ranked results. The ranking similarity of image objects matched.

As previously noted, our inventive SEMCOG technique allows both semantics and cognition-based query specifications. As a result, the user query interface is more natural and flexible and the language expression capability is more powerful. Moreover, SEMCOG is also object-based, allowing users to specify objects with finer granularity than a whole image.

Figure 2:
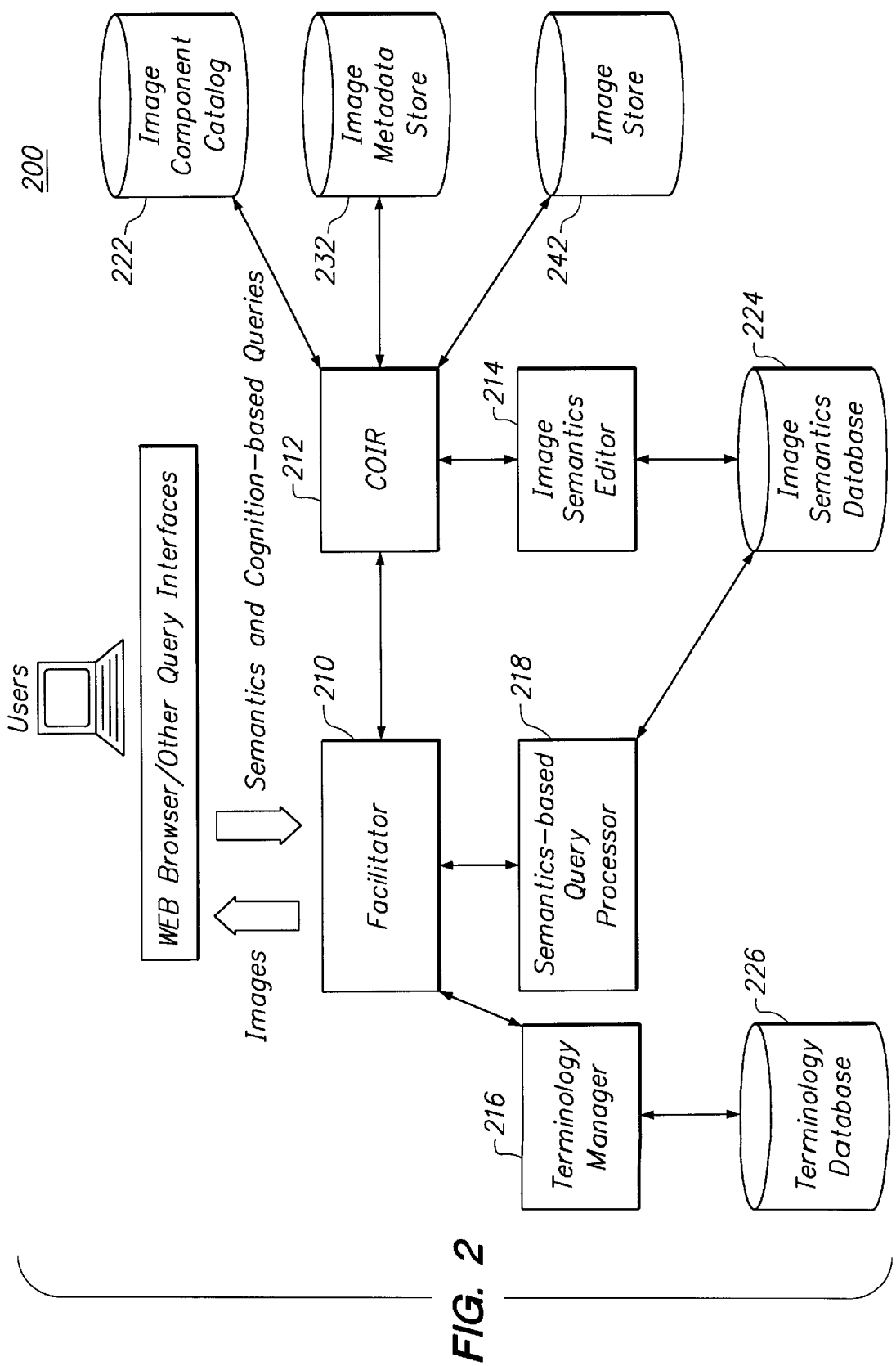
FIG. 2 is a block diagram of the present invention.

A block-diagram architecture of our inventive Semantic and Cognition based image retrieval method and system (SEMCOG) is shown in FIG. 2. With reference now to that Figure, SEMCOG comprises five components, namely: facilitator 210, content oriented image retrieval system (COIR) 212, image semantics editor 214, terminology manager 216, and semantics-based query processor 218. Additional components include terminology database 226, image semantics database 224, image component catalog 222, image metadata store 232 and image store 242.

The facilitator 210 coordinates the interactions between the various components of SEMCOG. It reformulates users' queries and forwards cognition-based query processing to COIR 212 and non-cognition-based query processing and changing sequences of predicates for query optimization purposes to the query processor 218. The query reformulation includes rewriting queries and changing sequences of predicates for query optimization purposes. Advantageously, these tasks are performed by the facilitator 210 instead of lower level components such as the semantics-based query processor 218, therefore a more efficient execution plan is produced. One reason for this efficiency is that the facilitator 210 has a more complete knowledge of query execution statistics and therefore can provide globally optimized query processing. Additionally, the facilitator 210 provides uniform handling of different types or rewrites (term relaxations, adjective relaxations, rule rewritings etc.).

Query reformulation and relaxation requires access to terminology database 226, to resolve the terminology heterogeneity between users' terms and terms stored in image semantics database 224. For example, a user may submit a query as "Retrieve all images in which there is an appliance." However, the term appliance is a generalized concept rather than an object. Consequently, the query is treated as: "Retrieve all images in which there is a TV, a radio, or a computer." A further example of relaxation is: "Retrieve all images in which there is a man." In this case, the terminology manager 216 suggests relaxation of man into human, i.e., "Retrieve all images in which there is a human". . .

COIR 212, provides content-oriented image retrieval. It retrieves images based upon colors and shapes as specified by users. Advantageously, COIR 212 is object-based, and can perform the following tasks: it can (1) find all images that match a given image or (2) return a similarity value when it is given two images or image components.

Figure 3:
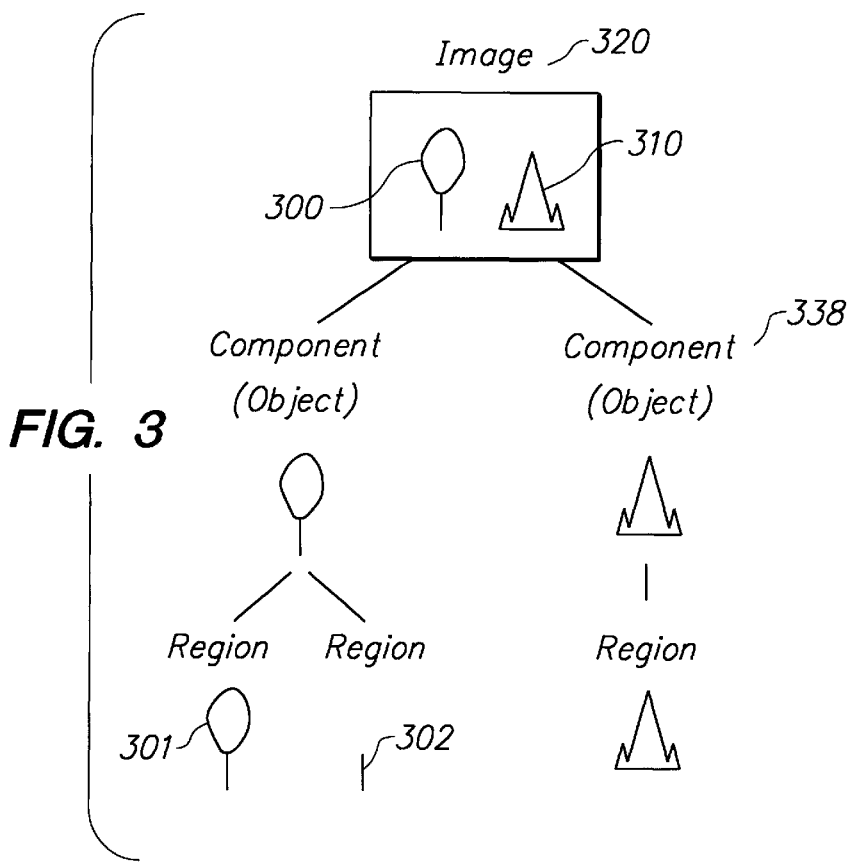
FIG. 3 depicts the process of image composition according to the present invention.

Before discussing the COIR object-based approach in greater detail, it is necessary to first define several terms used herein. With reference now to FIG. 3, a region is defined as a homogenous (in terms of colors) and continuous segment identified by COIR 212. A component (or an object) is an entity that is assigned a semantic meaning. Importantly, a component may contain one or more regions and there can be several components in an image. For example, in FIG. 3, the tree 300 contains 2 regions namely the foliage 301 and the trunk 302, while the mountain 310 has only one region. Advantageously, a region is viewed as a physical object and a component is viewed as a logical object. The relationships between image 320, object, component 330, and region 340 are illustrated in FIG. 3.

Note that COIR 212, alone, can not identify the objects within an image. The main task of the COIR 212 is to identify image regions. Since an object may consist of multiple image regions, COIR 212 consults an image component catalog 222 for matching sets of image objects.

As can be readily understood by those in the art and as previously described, COIR 212 may not be able to find an acceptable match for a component if there is no corresponding object in the image component catalog 222 or any corresponding similarities are lower than a pre-defined threshold. In other cases, COIR 212 may "recommend" multiple corresponding objects in the image component catalog 222 because there are multiple matching objects. In both cases, it is necessary to have the image semantics editor 214 user needs to solve the conflicts. Alternatively, a user can override the recommendations of COIR 212.

Figure 4:
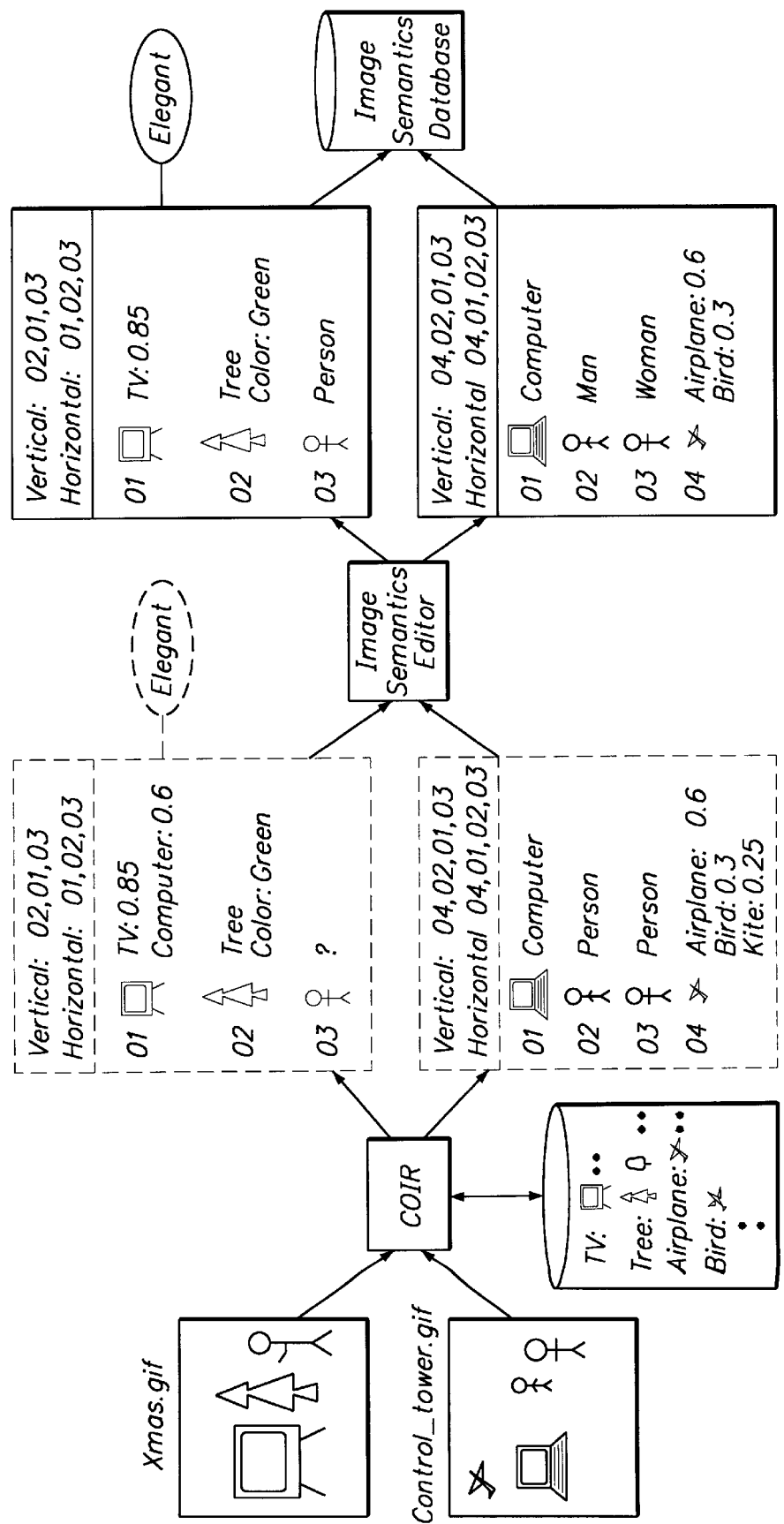
FIG. 4 shows image semantics extraction according to the present invention.

The image semantics editor 214 interacts with COIR 212 to edit the semantics of an image. The interactions between COIR 212 and the editor 214 are shown in FIG. 4. The steps involved in image semantics extraction and editing are as follows:

Step 1: COIR 212 identifies image components of an image. For example, in FIG. 4, COIR 212 identifies three components in Xmas.gif, O1, O2, and O3, and four components in Control_tower.gif, O1, O2, O3, and O4, respectively.

Step 2: COIR 212 compares the image components from step 1 with an existing image component catalog 222 to generate possible semantics of each individual components. During this process, COIR 212 also produces a ranking based on the similarities between image components and the objects in the catalog 222. In our example, COIR 212 successfully identifies O2 of Xmas.gif as a tree with color of green, but COR 212 fails to identity O3 of Xmas.gif and is not sure about O1 of Xmas.gif and O4 of Control_tower.gif. For O4, COIR 212 generates a list of semantics: airplane with ranking 0.6, bird with 0.3, and kite with 0.25. At this step, COIR 212 also identifies the vertical and horizontal relations between objects. These spatial relationships are identified based on the comparison of the four outermost points of objects' components. In Xmas.gif, the components' vertical relation from top to bottom is O2, and O3 as shown in FIG. 4. In FIG. 4, the results generated in this step is shown in two boxes in dashed lines since these results are temporary, a recommendation by COIR 212.

Step 3: The editor user makes necessary selections or modifications through interactions with the semantics editor 214. For instance, in our example, user decides that O4 of Control_tower.gif is not a kite and eliminates that possibility. However, the user is still not sure about whether or not it is an airplane or a bird, so the user decides to leave two possible semantic meanings of O4 of Control_tower.gif with ranking as shown in the right side of FIG. 4. Please note that the user can also override and change ranking.

Figure 5:
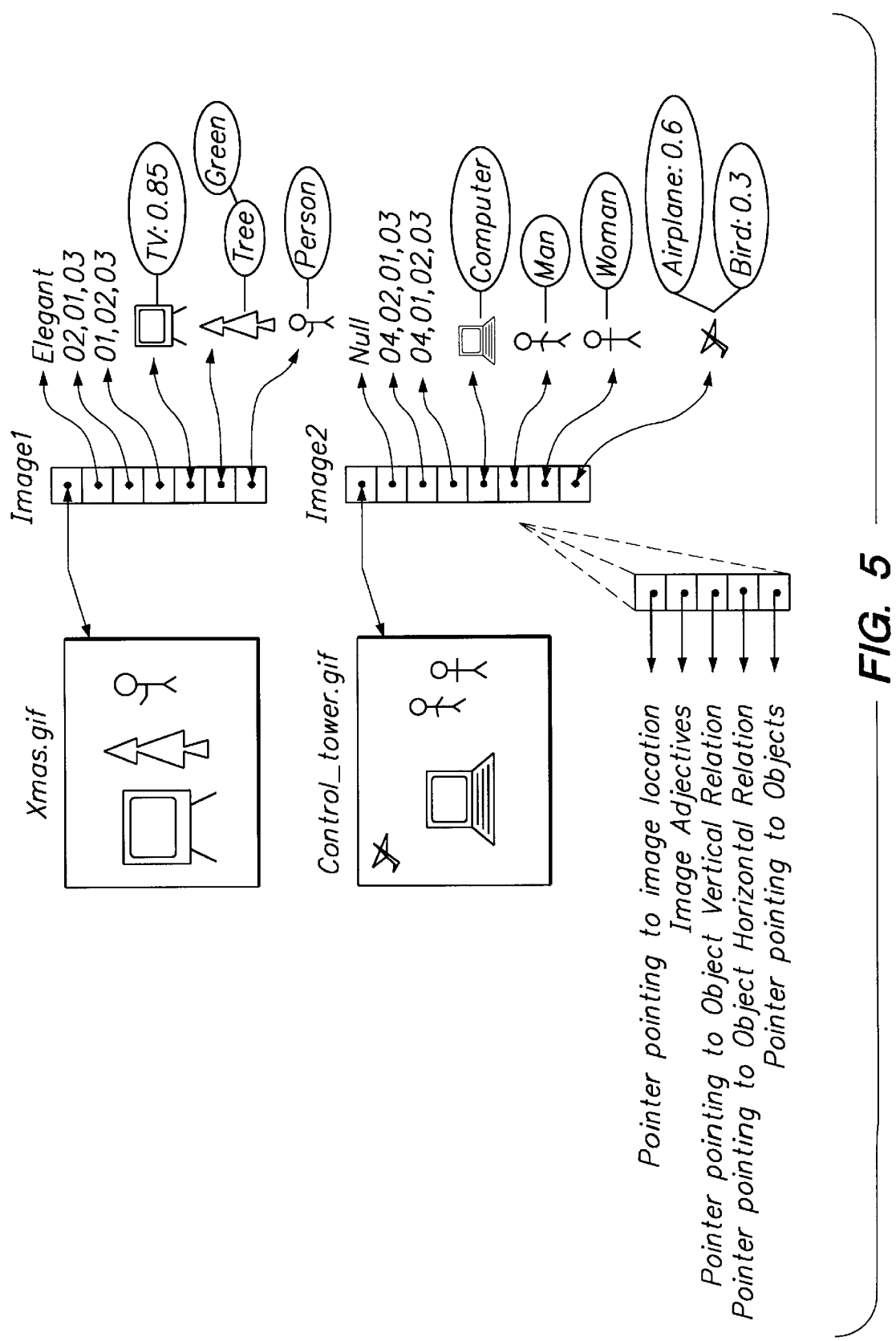
FIG. 5 shows the relationship between an image and semantics necessary for retrieval according to the present invention.

Step 4: The editor 214 stores the image semantics into the image semantics database 224. The image semantics database 224 is conceptually visualized in FIG. 5. The semantics of an image can be represented as a linked list of pointers pointing to the image and its components. Each image has a tag that contains a list of adjectives describing attributes associated with the whole image. An example of adjectives can be "elegant". "elegant" can be associated with an image by examining the image's color combination. Each component also has tags describing its attributes, such as colors.

Note that the image metadata store 232 shown in FIG. 2 stores pre-extracted image metadata, such as colors and shapes, and the image component catalog 222 is built incrementally as image semantics editor 214 users select a portion of image component and store them as "samples" in the image component catalog 222.

TABLE 1

Terminology Base

Figure 7:
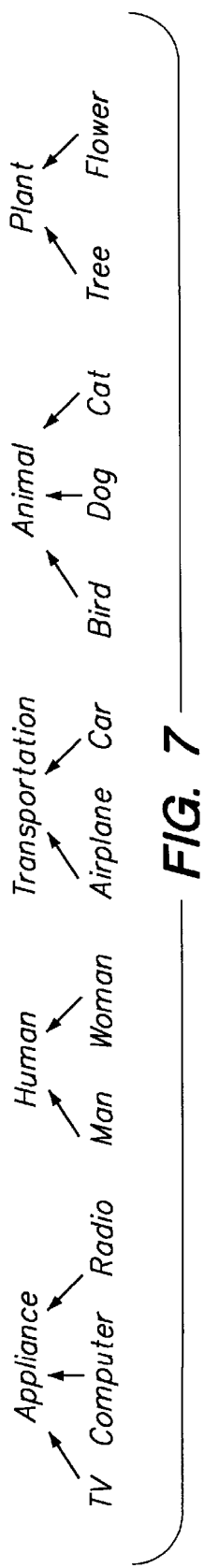
FIG. 7 shows the hierarchical relationship of terminology used in the present invention.

TV is-a Appliance
Computer is-a Appliance
Radio is-a Appliance
Man is-a Person
Woman is a Person
Airplane is-Transportation
Car is Transportation
Bird is an Animal
Dog is-an Animal
Cat is-an Animal TABLE 1-continued Terminology Base Tree is-a Plant
Flower is-a Plant The terminology manager 216 maintains a terminology database 226 that is used for query relaxation and term heterogeneity resolution. An example of a terminology base is shown in Table 1. A helpful way to view the terminology base is as a forest that contains many trees in which each tree represents related concepts structured hierarchically. For instance, the terminology in Table 1 can be visualized as shown in FIG. 7.

When presented with a term, the terminology manager 216 can return multiple matching alternatives with a corresponding ranking. The rankings are then used during the query processing to generate the final ranking of the results.

The semantics-based query processor 218 provides answers to queries concerning the semantics information stored in images. The image semantics required for query processing is pre-extracted from the images using COIR 212 and the image semantics editor 214. The image semantics data 224 is stored in an image semantics database 224 resulting in a quick response time. An example of semantic query that can be answered by the semantics-based query processor 218 is: "Which objects are to the right of a tree in image Xmas.gif?"

TABLE 2

Information maintained in SEMCOG and Its Usage

| Information | Maintained By | Used By | Purposes |
|---|---|---|---|
| Terminology database | Terminology Manager | Facilitator | Query relaxation |
| Image semantics database | Image semantics editor | Semantics-based query processor | Semantics-based query processing |
| Image component catalog | COIR | COIR | Image component identification |
| Image metadata store | COIR | COIR | Cognition-based matching |
| Image store | COIR | COIR and facilitator | Image storage |

As can be readily appreciated by those skilled in the art, SEMCOG maintains a large body of information. The information maintained in SEMCOG and its usage is summarized in Table 2. Note that our inventive method and apparatus is designed as an open architecture that can be applied to other media, such as audio and video. The information maintained in SEMCOG can be categorized into two types as follows Media independent information, such as the terminology database 226 and the image semantics database 224; and Media dependent information, such as the image component catalog 222, the image metadata store 232, and the image store 242.

Advantageously, our design permits seamless application to other media by replacing the image component catalog 222, the image metadata store 232, and the image store 242 with components that are more suitable to other media.

Figure 6:
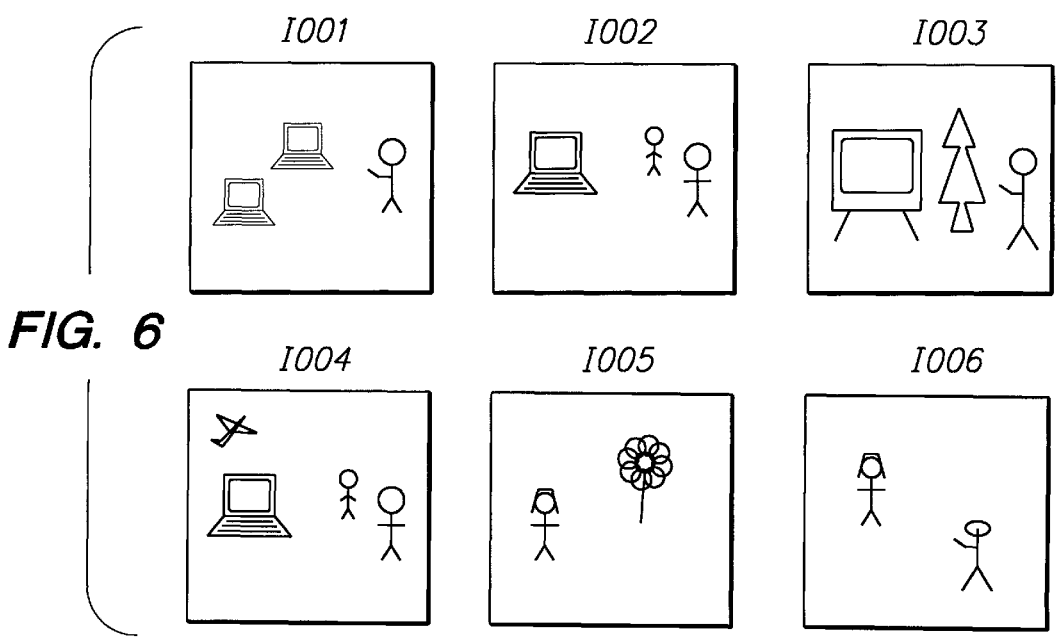
FIG. 6 shows representative images in a database subject to search according to the present invention.

With reference now to FIG. 6, there it shows the data structure of image semantics stored in SEMCOG. Here we layout the image semantics as tables. For ease of illustration, we assume that an image database ImageDB contains six images (I001, I002, I003, I004, I005 and I006), which are shown further in FIG. 8. A table of the objects that are contained within each image is listed in Table 3. Note that in operation, these objects are extracted from the images by the COIR system. As preferably implemented, the coordinates are pointers pointing to components in images.

The properties of the objects maintained are described in Table 4. As can be seen, each object has a corresponding image, a set of coordinates describing its location within that image, and a set of semantics. In operation, the semantics are returned by the COIR system along with corresponding similarity ranking range between 0.0 and 1.0. For example and with reference to Table 4, object O201 is similar to a computer with ranking of 0.98 and it is similar to a television with ranking of 0.85.

Finally, SEMCOG also maintains the spatial relationships between the objects in the database. Table 5 shows how these relationships are represented in SEMCOG. SEMCOG maintains this information about the images so that queries can be expeditiously processed off line as when performing cognition-based image matching.

TABLE 3

Objects contained within the images

| Images | Adjectives | Objects |
|---|---|---|
| I001 | | O101 O102 O103 |
| I002 | | O201 O202 O203 |
| I003 | Elegant | O301 O302 O303 |
| I004 | | O401 O402 O403 O404 |
| I005 | | O501 O502 |
| I006 | | O601 O602 |

TABLE 4

Properties of the objects

| Object | Image | Semantics | Similarity | Semantics | Similarity | ... | Coord. | Adj. |
|---|---|---|---|---|---|---|---|---|
| O101 | I001 | Computer | 0.93 | TV | 0.65 | ... | | |
| O102 | I001 | Computer | 0.82 | Window | 0.25 | ... | | |
| O103 | I001 | Man | 0.75 | Woman | 0.69 | ... | | |
| O201 | I002 | Computer | 0.98 | TV | 0.85 | ... | | |
| O202 | I002 | Man | 0.88 | Statue | 0.45 | ... | | |
| O203 | I002 | Man | 0.76 | Statue | 0.55 | ... | | |
| O301 | I003 | TV | 0.85 | | | ... | | |
| O302 | I003 | Tree | 1.00 | | | ... | | Green |
| O303 | I003 | Human | 1.00 | | | ... | | |
| O401 | I004 | Airplane | 0.60 | Bird | 0.30 | ... | | |
| O402 | I004 | Computer | 1.00 | | | ... | | |
| O403 | I004 | Man | 1.00 | | | ... | | |
| O404 | I004 | Woman | 1.00 | | | ... | | |
| O501 | I005 | Woman | 0.82 | Statue | 0.34 | ... | | |
| O502 | I005 | Flower | 0.67 | Bird | 0.37 | ... | | |
| O601 | I006 | Woman | 0.95 | Child | 0.66 | ... | | |
| O602 | I006 | Man | 0.79 | Chimpanzee | 0.62 | ... | | |

TABLE 5

Spatial relationships of the objects

| Image | Orientation | Objects |
|---|---|---|
| I001 | horizontal | O101 O102 O103 |
|  | vertical | O102 O103 O101 |
| I002 | horizontal | O201 O202 O203 |
|  | vertical | O202 O203 O201 |
| I003 | horizontal | O301 O302 O303 |
|  | vertical | O301 O302 O303 |
| I004 | horizontal | O401 O402 O403 O404 |
|  | vertical | O404 O403 O402 O401 |
| I005 | horizontal | O501 O502 |
|  | vertical | O502 O501 |
| I006 | horizontal | O601 O602 |
|  | vertical | O601 O602 |

We now present an overview CSQL (Cognition and Semantics-based Query Language), that is used as the query language in SEMCOG. In so doing, we introduce the terminologies and syntax in CSQL and illustrate its capabilities and expressive power.

As can be appreciated, an image or an object can be interpreted either semantically or visually. A semantic interpretation of an image is the "real world meaning" of the image. A visual interpretation of an image, on the other hand, is how this image looks. Ideally the semantic interpretation and visual interpretation of an image should be consistent with one another.

For example, the semantic interpretation (meaning) of an image of a man is "man". However, the visual interpretation of this image can be "human" if we are unable to determine whether the image is that of a man or a woman. Another example can be an image of a doll. In this example, the image's semantic interpretation is "doll" but its visual interpretation can be "woman" or "human" since it may not be possible to determine whether or not the object is animate.

In SEMCOG, there are three types of entities. They are 1) semantic entities, 2) image entities; and 3) dual entities. These entities form the basis of all user queries and their definitions follow.

Semantic entities are those entities having only semantic identities. More specifically, semantic descriptions of objects, or terminologies, are treated by SEMCOG as semantic entities. As such, a user may use such semantic descriptions to retrieve an image. Some examples of semantic entities are "man", "red car", and "plane".

Figure 9:
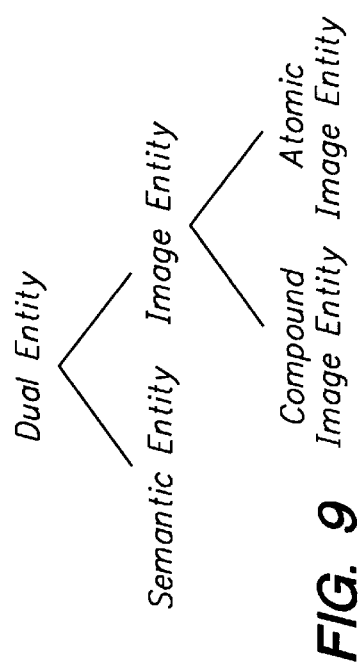
FIG. 9 shows the classification of entities used in the present invention.

An image entity is an entity having only image identities. Besides the semantic descriptions, users may also use example images and/or sketches to describe what they are searching for. Such images and sketches constitute image entities. Referring to FIG. 9, image entities may be atomic, i.e. may contain a single object, or may be compound, i.e. may contain multiple objects.

Dual entities are polymorphic entities which may behave as semantic entities or image entities as needed. A dual entity has both semantic identity and image identity, As such, when individual objects within a component image entity are extracted, these extracted objects are stored as dual entities, because such objects have both semantic identities and image identities as shown in FIG. 9. The image identity and semantic identity may not be consistent due to limitations of current image processing capabilities as previously described.

Importantly, dual entities can never be inputs or outputs of the queries, instead they only exist during the query processing. The semantic identities are semantically described whereas the image identities are kept as pointers to the corresponding portions of the images. Note that the image identity of a dual object can not be compound.

Importantly, SEMCOG allows users to present queries for semantic entities and image entities. For example, 1. "Retrieve the semantic means of the objects present in this image", and
2. "Retrieve all objects present in this image"

are both valid queries.

Note that, in example query 1 above, we are asking for the semantic identity of a dual entity and in the second query, we are asking for the image identity of the same dual entity. The components contained in images are dual entities, hence they must be converted into semantic entities or image entities to be returned as outputs. Advantageously, users of our inventive method and system may use the entities introduced above to describe different types of selection criteria.

Query criteria based on the entities and operators involved may be categorized as follows:

Semantics-based selection criteria: With semantics based selection, users specify semantic expressions to retrieve images. Since semantic terminologies are not standardized, in many cases, users may not be able to provide precise semantics of the entities. Hence, in SEMCOG, users are allowed to describe different levels of strictness for semantic relationships between entities using the following binary predicates:

1. —is: The is predicate returns true if and only if both of the arguments have identical semantics (man vs. man, car vs. car).
2. —is_a: The is_a predicate returns true if and only if the second argument is a generalization of the first one (car vs. transportation, man vs. human).
3. —s_like: The s_like predicate returns true if and only if both arguments are semantically similar (man vs. woman, car vs. truck).

Note that arguments of the above predicates can be semantic, image, or dual entities. In all these cases, the comparison of the entities is made on their semantic identities because the type of comparison is defined by the operators. If the argument is a dual entity, its semantic identity is used. If the argument is an image entity, then its semantics must be extracted before the comparison. Consequently, a more expensive comparison results. If the image entity is compound (i.e. the entity has more than one component), then such a comparison may not be meaningful since the components may have different semantics.

Cognition-based selection criteria: Cognition based selection may be used by users to retrieve images. In this regard, SEMCOG allows users to describe different cognition-based selection criteria between entities using the following binary predicates:

1. —i_like: The two arguments to the i_like predicate are either image entities or dual entities. In this case, the system compares the two entities based on their image identities. Since the semantics are not involved in the process, the input images can be compound as well.
2. —contains: The first argument of the predicate must be an image entity. The binary contains predicate returns true if the second argument, which is a dual entity, is contained in the first argument, which is an image entity. This predicate is mainly used to extract the components of a compound image. The reason why the first argument must be a compound image entity is because the granularity of the first argument must be in a higher level than the second argument, which is atomic.

Scene-based selection criteria: As we discussed earlier, CSQL allows users to describe the spatial relationships between the entities that constitute an image.

3. —to_the_right_of . . . in: This predicate takes two entities (semantic or dual) and an image entity, and it checks whether the first of the entities is to the right of the second entity and within the image entity. If the user provides a dual entity as one of the first two predicates, the system uses its semantic identity unless the dual entity is extracted from the given image entity. In that case, on the other hand, the system uses its image identity (and its coordinates) to check for the truth of the predicate.

4. —to_the_left_of . . . in, above_of . . . in. Please note that these spatial relationships are those that can be automatically identified by COIR 212. Other spatial relationships, such as in_front_of and behind, are more difficult tasks for any image processing technique to perform fully automatically. These predicates are similar to the to_the_right_of . . . in predicate, and their predicate names are self explanatory.

We will add an attached predicate, to find the adjacent objects within an image to SEMCOG after we add the corresponding functionality to COIR.

Besides the above selection criteria and predicates, CSQL also allows users to elaborate on their query specifications using adjectives. There are two types of adjectives defined in CSQL: color adjectives and image adjectives. Color adjectives apply to semantic entities as well as their associated atomic image entities. An atomic image entity car can be further described as red car or white. On the other hand, image adjectives apply to the whole image entities including compound and atomic image entities. An example of image adjectives is (elegant imageID). The elegant adjective has been implemented in COIR 212. An image is considered elegant based on the color combination of its regions. Dual entities can have both types of the adjectives; the color adjectives apply to their semantic identities and the image adjectives apply to their image identities. Please note that in the work, we only consider those adjectives that can be automatically identified by COIR 212, such as colors. Other adjectives such as large and small are more difficult to identify since these adjectives are relative, not absolute.

Additionally, CSQL allows nested queries through the use of two filtering predicates: best_of_the and one_of_the. The best_of_the predicate filters out the best matching answer of a query. Note that the query must have only one free variable. The best_of_the can be used for reducing the number of queries generated by query relaxation. On the other hand, the one_of_the predicate returns all the answers to the input query. Again, the input query must have only one free variable.

In summary, SEMCOG allows its users to retrieve images based on the following criteria:

Image similarity. In many image database applications, users are interested in similar-based retrievals where user provides a base image and the image database returns similar one(s). In a preferred embodiment, a user may either pick the base images from one or more image pools or they may draw sketches to describe what they expect as the result. This is a cognition-based selection criteria.

Containment: In some other applications, a user may desire to select those images that contain particular entities. An entity of interest may be an atomic image entity, a sketch of an object, or it may be a semantic description of an object. In such queries, it is usually insufficient to compare the entity with the images. Instead, the system must evaluate the semantics of the user inputs, and it must retrieve images that satisfy the corresponding semantic description. An example of this type of queries is (the underlined words correspond to the terms or images provided by the user):

"select image P where (P contains X) and (X is man) and Xi_like <<a sketch>>)."

Spatial relationship: Spatial relationship may be used by a user to describe the spatial relationships between the entities that should be available in the retrieval images. Importantly, the user may be interested in not only the objects which are available within an image, but also in the spatial relationships of these objects and their properties. For example, a real estate broker may ask a query to retrieve all images of candidate real estate in which there is a tree to the right of the house.

In the most basic approach, the real estate broker may formulate the above query by drawing a sketch of a house and a tree that is to the right of the house. SEMCOG then would use the image similarity criterion to find all images that looks like the one he drew. However, with this approach, the success of the search would highly depend on the artistic capabilities of the real estate broker. Note that this is an expensive operation since it is a pure cognition-based approach. In contrast, using CSQL the above query can be stated as follows:

"select image P where (X is house) and (Y $s_{13}$ like tree) and (Y to_the_right_of X)".

A user can use a combination of all three types of selection criteria discussed above with more descriptive adjectives to formulate a more complicated query such as:

"Select all images where there is a man standing to the left of a red car, where the car looks like <<a sketch>>."

In the above query, the user not only verbally describes the objects and their relationships, but also provides a sketch, i.e. more detailed description of what he expects to see. Such a query can be formulated in CSQL as:

"select image P where (P contains X) and (P contains Y) and (X is to_the_right_of Y in P) and (X is man) and (Y is red car) and (Y i_like pictureID)."

where pictureID is a pointer to a sketch provided by the user.

Figure 10:
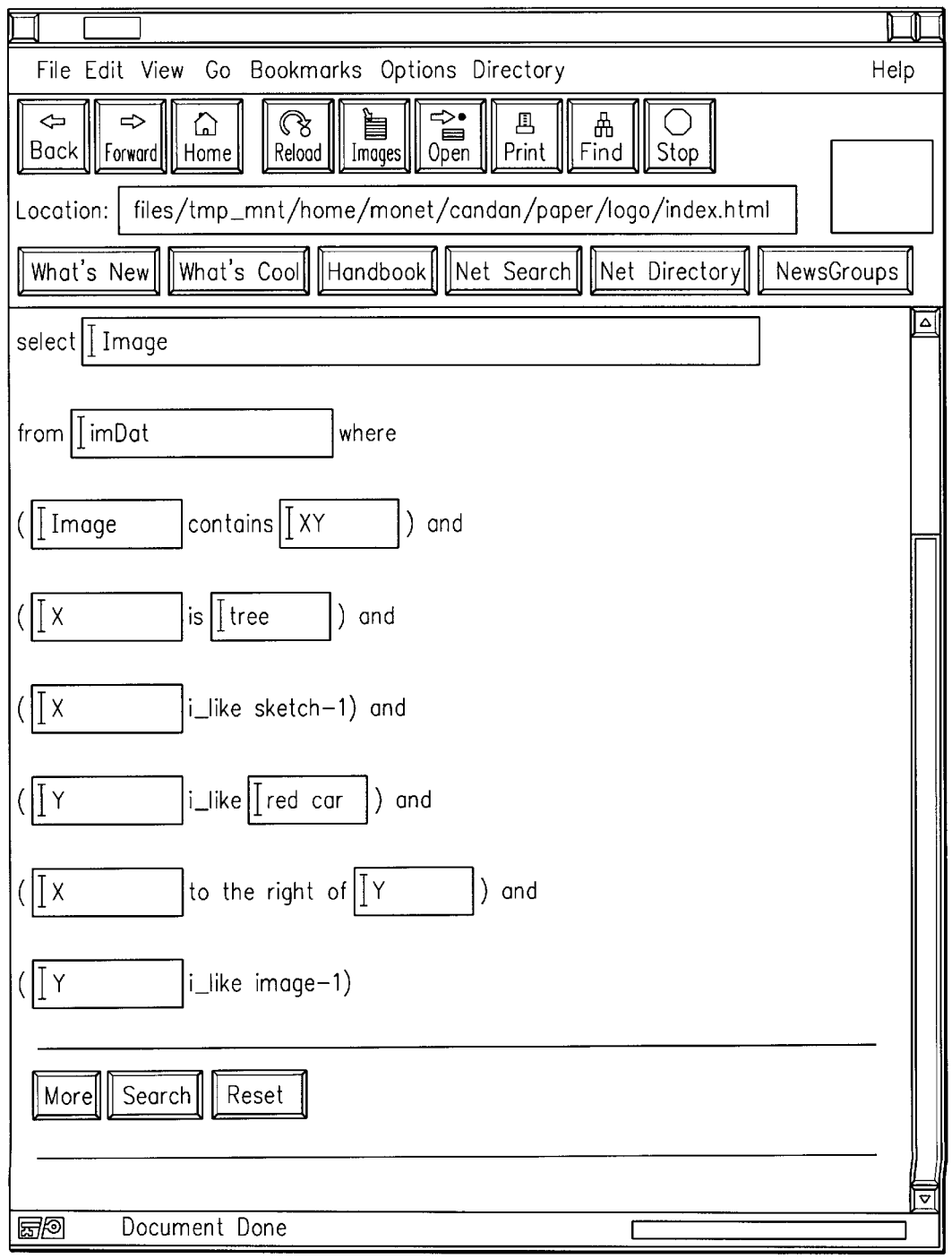
FIG. 10 shows an example query input menu according to the present invention.
Figure 13:
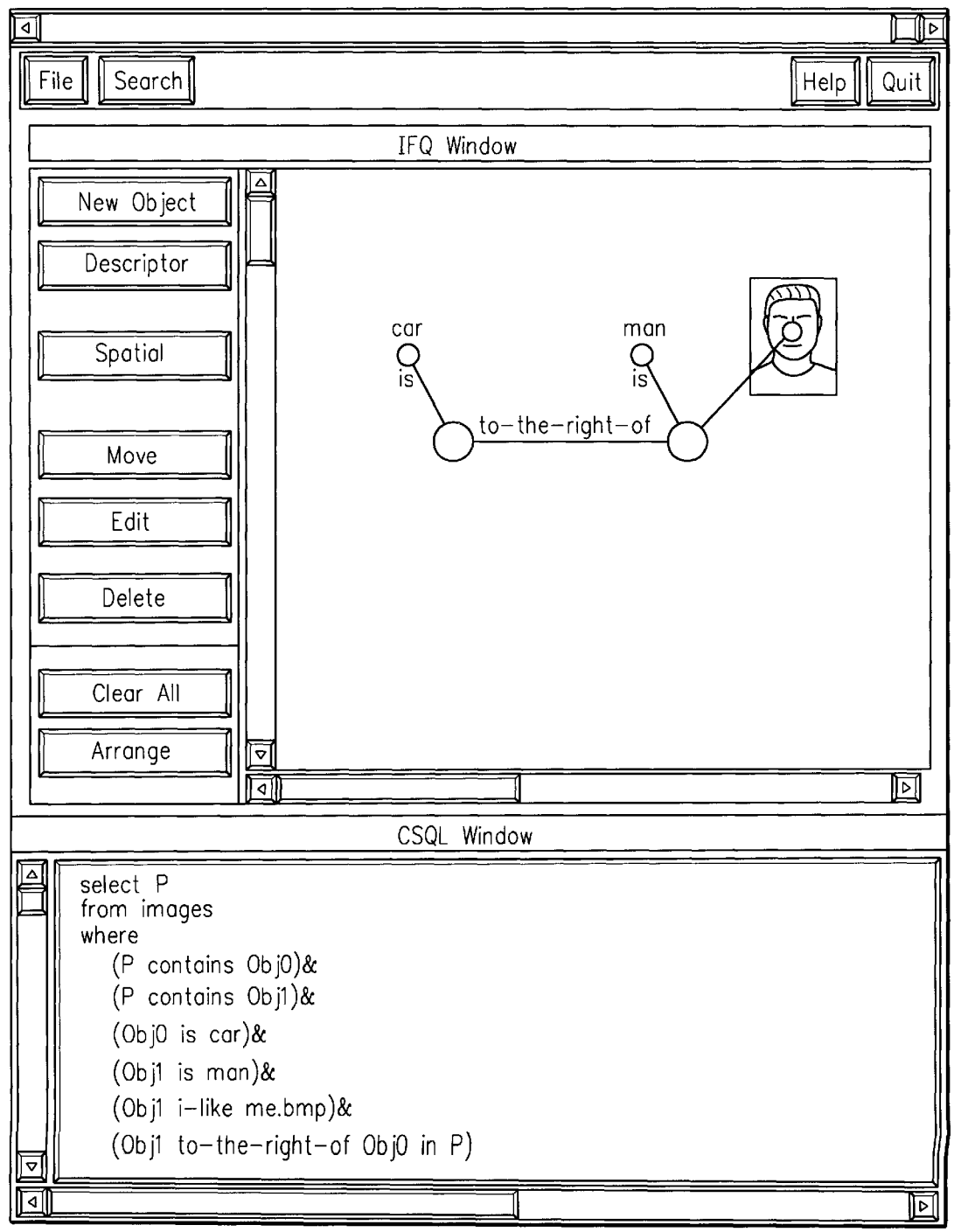
FIG. 13 shows an IFQ menu according to the present invention.

With this background in place, we may now describe the query language used in SEMCOG in greater detail. We have introduced the entities and predicates used in SEMCOG and CSQL. Further examples showing the use of this query language and the screen dumps of the user interface based on this query language are shown in FIGS. 10 and 13.

SEMCOG provides an "SQL-like" query language (CSQL) which lets a user to query for the images in a database or for the objects within those images. It allows three types of queries: semantics-based, cognition-based, and relationship-based. SEMCOG also allows users to create complex queries which may involve two or more of the above mentioned query types. In addition to these, users can create nested queries.

Table 6 provides an overview of the predicates that SEMCOG uses for handling semantics- and cognition-based image retrieval. In the columns $1^{st}$ argument and $2^{nd}$ argument, we use s, d, and i to indicate the types of entities are allowed. The s, d, and i stand for semantic entity, dual entity, and image entity respectively. In the following section we describe the mechanics of the query processing and we show how these predicates are used and processed.

TABLE 6

Predicates and their usage

| Predicate | 1st argument | 2nd argument | 3rd argument | Discussion |
|---|---|---|---|---|
| is | s/d/i | s/d/i | | semantics are compared |
| is_a | s/d/i | s/d/i | | semantics are compared |
| s_like | s/d/i | s/d/i | | semantics are compared |
| i_like | d/i | d/i | | images are compared |
| contains | i | d | | semantics of dual is searched within image |
| to_the_right_of ... in | s/d | s/d | i | positions of entities are compared: if argument is a semantic entity or a dual entity outside of image i semantics of the argument is used, otherwise image of the dual is used. |
| to_the_left_of ... in | s/d | s/d | i | as above |
| above_of ... in | s/d | s/d | i | as above |
| below_of ... in | s/d | s/d | i | as above |
| best_of_the one_of_the | query | | | nested queries are processed: these are not regular predicates. The arguments of these quasi-predicates are queries themselves. |

Figure 8:
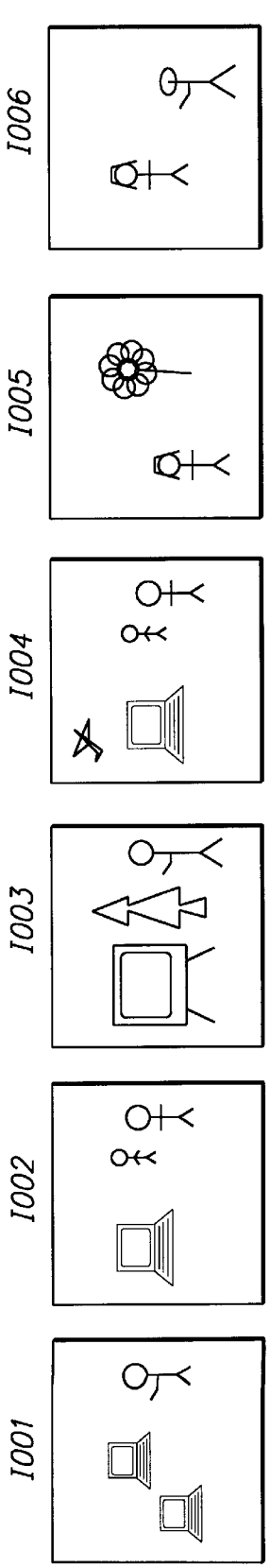
FIG. 8 shows example images contained in ImageDB.

We now use examples to show the query processing in SEMCOG. The databases used for the examples are shown in FIG. 8 and tables 3, 4, and 5 presented previously.

EXAMPLE 1

Retrieve all images in which there is a TV.
In CSQL syntax, this query can be posed as follows:
select image X
where X contains TV
The processing of this query involves the following steps:
Step 1: Facilitator 210 asks the semantic query processor 218 to find all images that contain a TV.
Step 2: The semantics-based query processor 218 checks the semantic information database 224 to find all the images that contain a TV by checking with Table 4. The result of this step, Ids of the matching images, are returned to the facilitator 210 with the corresponding similarity ranking values as follows:

| Object | Image | Semantics | Similarity | Semantics | Similarity | ... | Coord | Adj. |
|---|---|---|---|---|---|---|---|---|
| O101 | I001 | Computer | 0.93 | TV | 0.65 | ... | | |
| O201 | I002 | Computer | .98 | TV | 0.85 | | | |
| O301 | I003 | TV | 0.85 | | | | | |

Figure 14A:
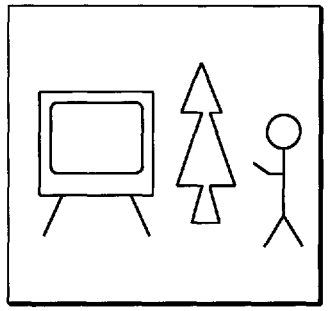
FIGS. 14(a)–(c) show image results of a query.
Figure 14B:
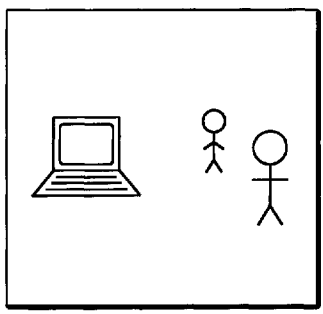
Figure 14C:
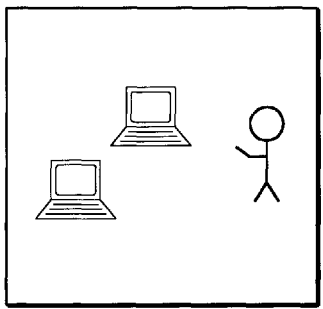

Step 3: The facilitator 210 returns the final results to the user. The final results are images with associated degrees of confidence as shown in FIGS. 14(*a*)–14(*e*). For FIG. 14(*a*) (image I003), the ranking is 0.85. For FIG. 14(*b*) (image I002), the degree of confidence is 0.85. For FIG. 14(*c*) (image I001), the degree of confidence is 0.65.
Step 4: If the user wants to see more results, then the facilitator 210 asks the semantics-based query processor 218 to relax the term TV.
Step 5: The semantics-based query processor 218 relaxes the comparison with TV and returns a new set of matching answers.

EXAMPLE 2

Retrieve all images in which there is a man and a transportation and this person is to the right of the transportation. This query can be posed as follows:
select image X
where X contains Y
and X contains Z
and Y is a <u>man</u>
and Z is_a <u>transportation</u>
and Y to_the_right_of Z in X
There are multiple ways to process this query. One such possible execution plans is as follows: The facilitator 210
Step 1: creates one image entity for X (ix), two dual entities for Y and Z (dy and dz respectively), and links these dual entities to the image entity ix.
Step 2: assigns man to the semantic component of dy.
Step 3: consults the semantics manager 216 for a list of transportations, and assigns the results to the semantic component of dz.

| transportation |
|---|
| Airplane |
| Car |

Step 4: passes ix, dy and dz to the semantics-based query processor 218 for the list of triples that satisfies the to_the_left_of ... in criterion. The query processor 218 returns answers as long as both the spatial criterion and the links created in Step 1 are simultaneously satisfied.

| Object | Image | Semantics | Similarity | Semantics | Similarity | ... | Coord. | Adj. |
|---|---|---|---|---|---|---|---|---|
| O103 | I001 | Man | 0.75 | Woman | 0.69 | ... | | |
| O202 | I002 | Man | 0.88 | Statue | 0.45 | ... | | |
| O203 | I002 | Man | 0.76 | Statue | 0.55 | ... | | |
| O403 | I004 | Man | 1.00 | | | ... | | |
| O602 | I006 | Man | 0.79 | Chimpanzee | 0.62 | ... | | |
| O401 | I004 | Airplane | 0.60 | Bird | 0.30 | ... | | |

Here, O403 and O401 satisfy the link created in Step 1, i.e. both of them the same image, 1004. They also satisfy the spatial constraint:

| Image | Orientation | Objects |
|---|---|---|
| I004 | horizontal | O401 O402 O403 O404 |

Figure 15:
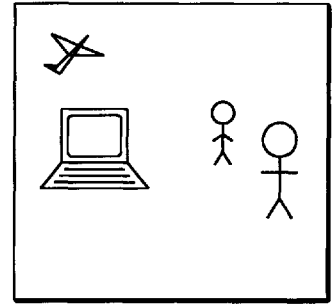
FIG. 15 shows another image query result.

Hence, as a result of this step, ix gets bound to I004 with confidence value 0.6.
Step 5: returns the Ids of the images returned by the semantics-based query processor 218. Since the previous step returned only I004, the result of the query is as shown in FIG. 15. In FIG. 15 (image I004), the ranking is 0.6.

If, on the other hand, the above query was specified as select image X where X contains Y and X contain Z and Y is human and Z is_a_transportation and Y to_the_right_of Z in X (by replacing man with human), then the query processing would be as follows:

Step 1: creates one image entity for X (ix), two dual entities for Y and Z (dy and dz respectively), and it links these dual entities to the image entity ix.

Step 2: assigns human to the semantic component of dy.

Step 3: consults the semantics manager 216 for a list of transportations, and assigns the results to the semantic component of dz.

| Transportation |
| --- |
| Airplane |
| Car |

Step 4: Facilitator 210 passes ix, dy, and dz to the semantics-based query processor 218 for a list of triples that satisfies the to_the_left_of . . . in criterion. The query processor returns answers as long as both the spatial criterion and the links created in Step 1 are simultaneously satisfied.

| Object | Image | Semantics | Similarity | Semantics | Similarity | ... | Coord. | Adj. |
| --- | --- | --- | --- | --- | --- | --- | --- | --- |
| O303 | I003 | Human | 1.00 | | | ... | | |
| O401 | I004 | Airplane | 0.60 | Bird | 0.30 | ... | | |

Now, since O303 and O401 are in different images, the link constraint imposed by step 1 is not satisfied. Hence, the result of this step is an empty set.

Step 5: Since there are no matching answers, facilitator 210 replaces the statement "Y is human" with "Y is_a human". Note that at this point there are many ways to relax the given query. In this example, we picked one of the possible relaxations.

Step 6: Facilitator 210 consults the semantics manager 216 for a list of humans, and assigns the results to the semantic component of dy.

| Human |
| --- |
| Man |
| Woman |

Step 7: Next, facilitator 210 passes in, dy and dz to the semantics-based query processor 218 for a list of triples that satisfies the to_the_left_of . . . in criterion. The query processor 218 returns answers as long as both the spatial criterion and the links created in Step 1 are simultaneously satisfied.

| Object | Image | Semantics | Similarity | Semantics | Similarity | ... | Coord. | Adj. |
| --- | --- | --- | --- | --- | --- | --- | --- | --- |
| O401 | I004 | Airplane | 0.60 | Bird | 0.30 | ... | | |
| O103 | I001 | Man | 0.75 | Woman | 0.69 | ... | | |
| O202 | I002 | Man | 0.88 | Statue | 0.45 | ... | | |
| O203 | I002 | Man | 0.76 | Statue | 0.55 | ... | | |
| O303 | I003 | Human | 1.00 | | | ... | | |
| O403 | I004 | Man | 1.00 | | | ... | | |
| O404 | I004 | Woman | 1.00 | | | ... | | |
| O501 | I005 | Woman | 0.82 | Statue | 0.34 | ... | | |
| O601 | I006 | Woman | 0.95 | Statue | 0.66 | ... | | |
| O602 | I006 | Man | 0.79 | Chimpanzee | 0.62 | ... | | |

Here, the object pairs O403–O401, and O404–O401 satisfy the link constraint imposed in Step 1, i.e. both of them belong to the same image, I004. Both pairs also satisfy the spatial constraint:

| Image | Orientation | Objects |
| --- | --- | --- |
| I004 | horizontal | O401 O402 O403 O404 |

As a result of this step, ix gets bound twice to I004 with confidence value 0.6 (once for O403–O401 and once for the O404–O401 pair). Please note that theoretically the degree of confidence should be equal to or less than 0.6 since we relax is to is_a.

| Image | Orientation | Obects |
| --- | --- | --- |
| I004 | horizontal | O401 O402 O403 O404 |

Step 8: The facilitator 210 removes the duplicates, and it returns the Ids of the images returned by the semantics-based query processor. Since the previous step returned two I004s, the result of the query is as shown in FIG. 15. In FIG. 15 (image I004), the ranking is 0.6.

EXAMPLE 3

Retrieve all images in which there is a green tree and there is an object which looks like this drawing.

Figure 16:
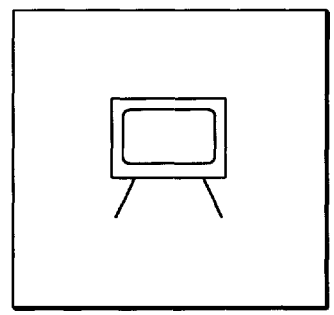
FIG. 16 shows another image query result.

This query can be stated as shown in FIG. 16 (Note that in this example we show not only how the facilitator 210 processes the query, but also how the binding of the variable entities are performed).

Step 1: The facilitator 210 uses the semantics-based query processor 218 to find all images that contain a green tree, and creates image entities to hold them.

| Object | Image | Semantics | Similarity | Semantics | Similarity | ... | Coord. | Adj. |
| --- | --- | --- | --- | --- | --- | --- | --- | --- |
| O302 | I003 | Tree | 1.00 | | | ... | | Green | ip→ <I003,1>

Here, 1 corresponds to the confidence in the generation of the entity. Since, in our example Image1 definitely contains a green tree (FIG. 6), the confidence value for ip is 1.

Step 2: The facilitator 210 uses, again, the semantics-based query processor 218 to find all objects in these images and stores each of these objects in a separate dual entity linked to ip.

| Image | Orientation | Objects |
|---|---|---|
| I003 | Elegant | O301 O302 O303 |

| Object | Image | Semantics | Similarity | Semantics | Similarity | ... | Coord. | Adj. |
|---|---|---|---|---|---|---|---|---|
| O301 | I003 | TV | 0.85 | | | ... | | |
| O302 | I003 | Tree | 1.00 | | | ... | | Green |
| O401 | I004 | Person | 1.00 | | | | | |

$dy_1 \rightarrow <ip,<tv\_image\_ptr,tv,1>>$ $dy_2 \rightarrow <ip,Itree\_image\_ptr,/green/tree,1>>$ $dy_3 \rightarrow <ip,<person\_image\_ptr,person,1>>$ Step 3: The facilitator 210 sends the image components of the dys to COIR 212 for matching with the image that the user provided. In our example, COIR 212 returns a similarity value of 0.97 for the image pointed by tv_image_ptr, and returns value close to 0.0 for the other two.

Step 4: If some of the image components stored in dys are matched by COIR 212 to the provided image, then facilitator 210 succeeds, and returns the corresponding ip as a result.

result→<I003, 0.97>

The image retrieved is as shown in FIG. 14(*a*). In FIG. 14(*a*)(image I003), the ranking is 1.0.

Figure 11:
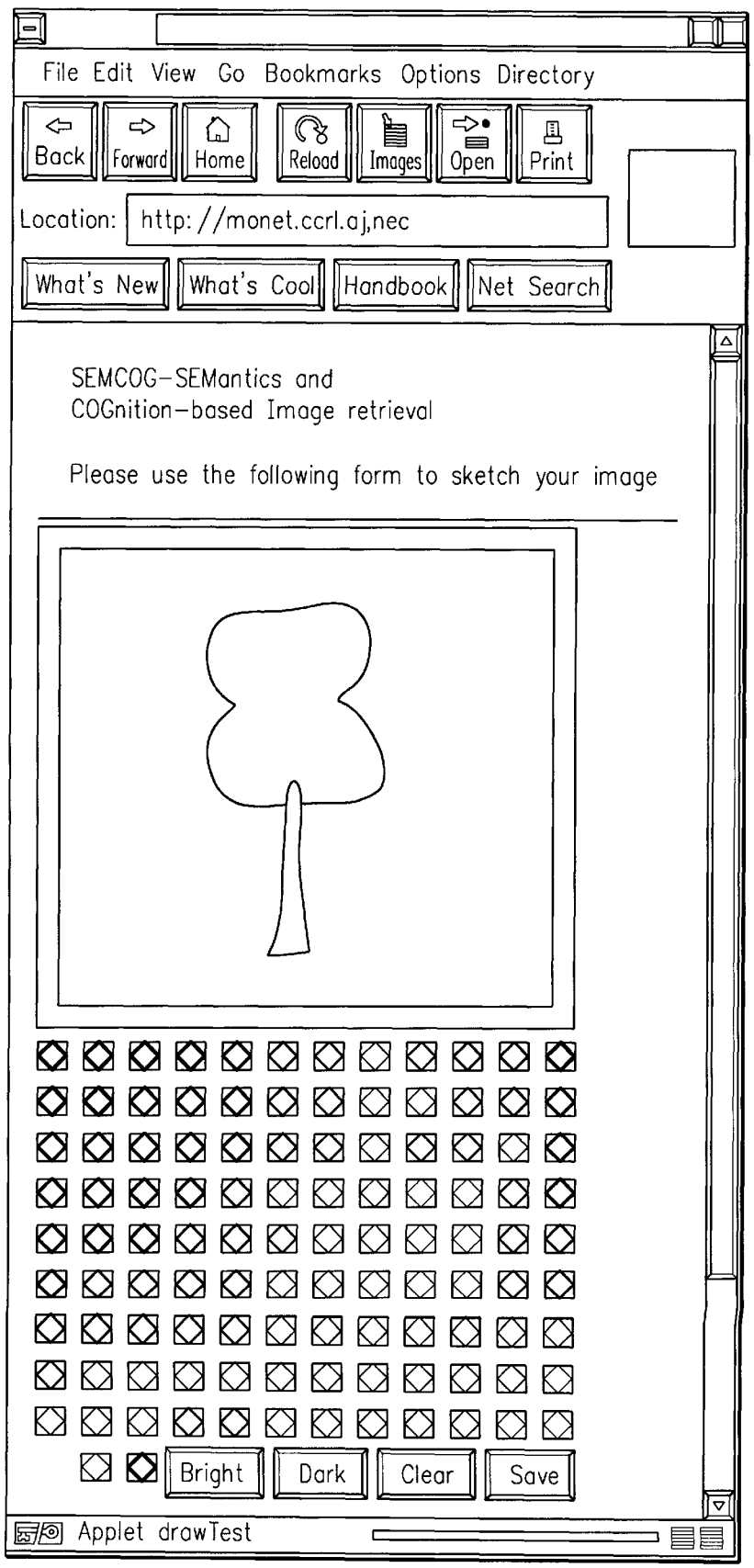
FIG. 11 shows an example sketch input menu according to the present invention.
Figure 12:
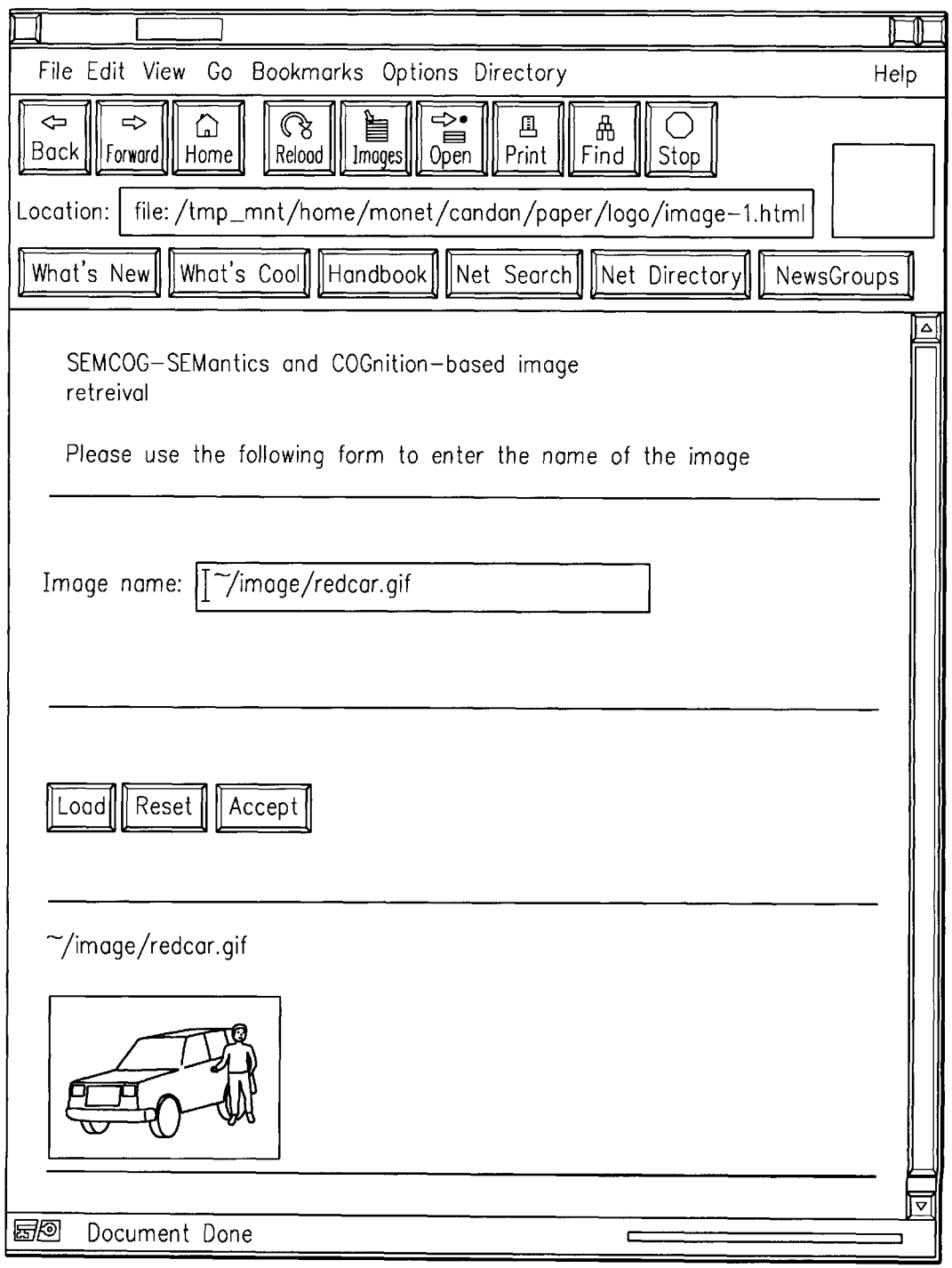
FIG. 12 shows an image input menu according to the present invention.

Those skilled in the art will quickly appreciate that SEMCOG may support a variety of interfaces. One such interface is shown in FIG. 10 where an HTML-based user interface is used for the main menu of image queries. Users can use this interface to specify CSQL directly. The windows for input sketches and specifying images will pop up by pressing familiar buttons or other controls. In a similar manner, FIG. 11 shows the interfaces implemented using Java for input sketches. FIG. 12 show the interface for input images by specifying the file path.

Advantageously, SEMCOG also supports a visually richer user query interface called IFQ (In Frame Query) that provides a natural image query user interface. FIG. 13 shows how the query "Retrieve all images in which there is a man to the right of a car and this man looks like this image" is generated using IFQ. With IFQ, the user uses a bullet to represent an object and then associates additional descriptors to describe the entity. In this example, the user uses "i_like<image>" and "is Man" to describe the object on the right and "is car" to describe the object on the left. The user then specify relations between these two objects. These queries using CSQL and IFQ are equivalent. As shown on the button on FIG. 13, the CSQL corresponding to IFQ specified by the user is generated by SEMCOG automatically. Please note that the user needs not be aware of the syntax and variable specification in CSQL since these are handled by the IFQ interface. We believe that IFQ provides a more natural way to pose semantics and cognition-based queries.

Of course, since our SEMCOG technique is computer implemented, computer systems that are capable of operating our technique are well known. Specifically, a computer, having a data processing system with processor, connected to a display monitor, user interface device such as a mouse, pen or digitizing tablet and keyboard in a conventional manner are appropriate to operate our inventive technique. Operating system, text/graphic interactive user interface and corresponding programs which provide the functionality of our technique, will reside and operate within the data processing system.

Clearly, it should now be quite evident to those skilled in the art, that while the invention was shown and described in detail in the context of a preferred embodiment, and with various modifications thereto, a wide variety of other modifications can be made without departing from the scope of the inventive teachings which should only be limited by the following claims.

What is claimed is:

1. A method of searching a database of images and retrieving at least one image contained in said database of images, comprising the steps of:
   i) generating a first set of images which match a semantic criteria of the at least one image to be retrieved;
   ii) generating a second set of images from the first set of images, which match a cognition criteria of the at least one image to be retrieved;
   iii) generating a third set of images from the second set of images, which match a scene criteria of the at least one image to be retrieved;
   iv) ranking the third set of images based on similarity to the semantic criteria and the cognition criteria of the at least one image to be retrieved into a set of results; and
   v) presenting the user with the set of results.

2. The method of claim 1, wherein said second set of images contains fewer images than said first set of images.

3. The method of claim 2, wherein said third set of images contains fewer images than said second set of images.

4. A method of querying a database of images, comprising the steps of:
   i) specifying a query having a semantics-based criteria and a cognition-based criteria;
   ii) processing said query based on said semantics-based criteria and said cognition-based criteria of said query to obtain a set of resulting images; and
   iii) providing said set of resulting images to a user.

5. The method of claim 4, wherein said step of specifying a query comprises specifying a query having said semantics-based criteria, said cognition-based criteria, and a scene-based criteria.

6. The method of claim 4, further comprising the step of ranking said set of resulting images based on similarity with said semantics-based criteria and said cognition-based criteria of said query prior to providing said set of resulting images to said user.

7. The method of claim 4, further comprising, subsequent to specifying said query, the step of verifying said query for term reformulation.

8. The method of claim 7, wherein the step of verifying said query further comprises determining alternative terms for inclusion in said query.

9. The method of claim 8, wherein the step of verifying said query further comprises one of reformulating said query to form a reformulated query and keeping said query unchanged.

10. The method of claim 9, wherein the step of processing said query comprises processing the one of said reformulated query and said query.

11. The method of claim 4, wherein the step of providing said resulting images to said user further comprises displaying said resulting images on a visual display unit for said user.

12. The method of claim 5, wherein the step of processing said query further comprises:
   forwarding said semantics-based criteria to a semantics-based query processor; and selecting a first set of images from said database of images, said first set of images having image object semantics corresponding to semantics specified in said semantics-based criteria.

13. The method of claim 12, wherein the step of processing said query further comprises, after the step of selecting said first set of images:

forwarding said cognition-based criteria to an image retrieval system;

identifying image regions in said cognition-based criteria; and selecting a second set of images from said first set of images, said second set of images having image objects which match said image regions of said cognition-based criteria.

14. The method of claim 13, wherein the step of processing said query further comprises after the step of selecting said second set of images:

forwarding said scene-based criteria to said semantics-based query processor;

selecting said set of resulting images from said second set of images, said resulting images having image objects in a spatial relationship specified in said scene-based criteria.

15. The method of claim 5, wherein the step of processing said query further comprises:

forwarding said cognition-based criteria to an image retrieval system;

identifying image regions in said cognition-based criteria; and selecting a first set of images from said database of images having image objects which match said image regions of said cognition-based criteria.

16. The method of claim 15, wherein the step of processing said query further comprises, after the step of selecting said first set of images:

forwarding said semantics-based criteria to a semantics-based query processor; and selecting a second set of images from said first set of images, said second set of images having image object semantics corresponding to semantics specified in said semantics-based criteria.

17. The method of claim 16, wherein the step of processing said query further comprises, after the step of selecting said second set of images:

forwarding said scene-based criteria to said semantics-based query processor;

selecting said set of resulting images from said second set of images, said resulting images having image objects in a spatial relationship specified in said scene-based criteria.

18. The method of claim 4, wherein said cognition-based criteria of said query comprises a color constituent and a shape constituent.

19. The method of claim 4, further comprising, prior to providing said set of resulting images to said user, the step of verifying said query for term relaxation.

20. The method of claim 19, wherein the step of verifying said query further comprises determining alternative terms and predicates for inclusion in said query.

21. The method of claim 20, wherein the step of verifying said query further comprises one of relaxing said query to form a relaxed query and keeping said query unchanged; and, if said relaxed query is formed, processing said relaxed query.

22. A method of searching a database of images and retrieving at least one image contained in said database of images, comprising the steps of:

i) generating a first set of images which match a semantics criteria of the at least one image to be retrieved;

ii) generating a second set of images from said first set of images which match a cognition criteria of the at least one image to be retrieved and;

iii) providing said at least one image contained in said database of images to a user.

23. The method of claim 22, further comprising the step of retrieving a third set of images from said second set of images which match a scene criteria of the at least one image to be retrieved, prior to providing said at least one image to said user.

24. The method of claim 22, further comprising the step of ranking said second set of images based on similarity to said semantic criteria and said cognition criteria of the at least one image to be retrieved, prior to providing said at least one image to said user.

25. The method of claim 22, wherein the step of providing said at least one image to said user further comprises displaying said at least one image on a visual display unit for said user.

26. The method of claim 22, wherein said cognition-based criteria comprises a color constituent and a shape constituent.

27. A method of searching a database of images and retrieving at least one image contained in said database of images, comprising the steps of:

i) generating a set of resulting images matching a semantics-based criteria and a cognition-based criteria of said at least one image to be retrieved from said database of images; and ii) presenting said set of resulting images to a user.

28. The method of claim 27, wherein said step of generating said set of resulting images further comprises matching a scene-based criteria of said at least one image to be retrieved from said database of images.

29. The method of claim 27, further comprising the step of ranking said set of resulting images based on similarity to said semantics-based criteria and said cognition-based criteria of said at least one image to be retrieved from said database of images prior to presenting said set of resulting images to said user.

30. The method of claim 27, wherein the step of presenting said set of resulting images to said user further comprises displaying said set of resulting images on a visual display unit for said user.

31. The method of claim 28, wherein the step of generating said set of resulting images further comprises:

forwarding said semantics-based criteria to a semantics-based query processor; and generating a first set of images from said database of images, said first set of images having image object semantics corresponding to semantics specified in said semantics-based criteria.

32. The method of claim 31, wherein the step of generating said set of resulting images further comprises, after the step of generating said first set of images:

forwarding said cognition-based criteria to an image retrieval system;

identifying image regions in said cognition-based criteria; and generating a second set of images from said first set of images, said second set of images having image objects which match said image regions of said cognition-based criteria.

33. The method of claim 32, wherein said step of generating said set of resulting images further comprises, after the step of generating said second set of images:

forwarding said scene-based criteria to said semantics-based query processor;

generating said set of resulting images from said second set of images, said set of resulting images having image objects in a spatial relationship specified in said scene-based criteria.

34. The method of claim 28, wherein the step of generating said set of resulting images further comprises:

forwarding said cognition-based criteria to an image retrieval system;

identifying image regions in said cognition-based criteria; and generating a first set of images from said database of images, said first set of images having image objects which match said image regions of said cognition-based criteria.

35. The method of claim 34, wherein the step of generating said set of resulting images further comprises, after the step of generating said first set of images:

forwarding said semantics-based criteria to a semantics-based query processor; and generating a second set of images from said first set of images, said second set of images having image object semantics corresponding to semantics specified in said semantics-based criteria.

36. The method of claim 35, wherein said step of generating said set of resulting images further comprises, after the step of generating said second set of images:

forwarding said scene-based criteria to said semantics-based query processor;

generating said set of resulting images from said second set of images, said set of resulting images having image objects in a spatial relationship specified in said scene-based criteria.

37. The method of claim 27, wherein said cognition-based criteria comprises a color constituent and a shape constituent.

* * * * *

UNITED STATES PATENT AND TRADEMARK OFFICE
CERTIFICATE OF CORRECTION

PATENT NO.   : 5,930,783
DATED        : June 27, 1999
INVENTOR(S)  : Wen-Syan Li et al.

It is certified that error appears in the above-identified patent and that said Letters Patent is hereby corrected as shown below:

Column 4,
Line 32, change "tree" to -- three --;

Column 6,
Line 17, change "COR" to -- COIR --;

Column 12,
Line 7, change "Xi_like" to -- (Xi_like --;
Line 30, change "$s_{13}$ like" to -- s_like --;

Column 14,
Line 1, change "14(a)-14(e)" to -- 14(a)-14(c) --;
Line 56, change "1004" to -- I004 --;

Column 15,
Line 62, change "in" to -- $ix$ --;

Column 16,
Line 34, change "Obects" to -- Objects --.

Signed and Sealed this

Fifth Day of March, 2002

Attest:

JAMES E. ROGAN
Attesting Officer
Director of the United States Patent and Trademark Office